United States Patent [19]
Loukas et al.

[11] Patent Number: 4,589,844
[45] Date of Patent: May 20, 1986

[54] HEAT EXCHANGE APPARATUS FOR INDUSTRIAL FURNACES

[75] Inventors: Paul W. Loukas, Willowdale; Rudolf E. Braune, Scarborough; Ekkehard Fischer, Agincourt, all of Canada

[73] Assignee: Advanced Combustion Inc., Weston, Canada

[21] Appl. No.: 634,447

[22] Filed: Jul. 25, 1984

[51] Int. Cl.$^4$ ............................. F24H 1/00; F24C 3/00
[52] U.S. Cl. ................................... 432/223; 126/91 A; 165/155
[58] Field of Search ...................... 432/223; 126/91 A; 165/155

[56] References Cited

U.S. PATENT DOCUMENTS

| | | | |
|---|---|---|---|
| 3,079,910 | 3/1963 | Bloom et al. | 126/91 A |
| 4,090,558 | 5/1978 | Akama | 165/155 |
| 4,493,309 | 1/1985 | Wedge et al. | 126/91 A |

FOREIGN PATENT DOCUMENTS 1154371 9/1983 Canada.
1095966 12/1954 France .................................. 165/155

Primary Examiner—John J. Camby
Attorney, Agent, or Firm—Weingarten, Schurgin, Gagnebin & Hayes

[57] ABSTRACT

A heat exchanger for heating air supplied to a burner is described. The heat exchanger includes two passages. One of the passages provides a channel through which combustion gas is exhausted from the burner while the other passage provides a channel through which air is supplied to the burner. The two passages are arranged to transfer heat from the combustion gas to the combustion air. Each of the passages includes a helical guide baffle for directing fluid through each respective passage substantially along a helical flow path. The helical guide baffles of the passages each exhibits a variable pitch which changes at a predetermined rate to maintain the pressure and velocity of the fluid in the respective passages within predetermined limits.

12 Claims, 4 Drawing Figures

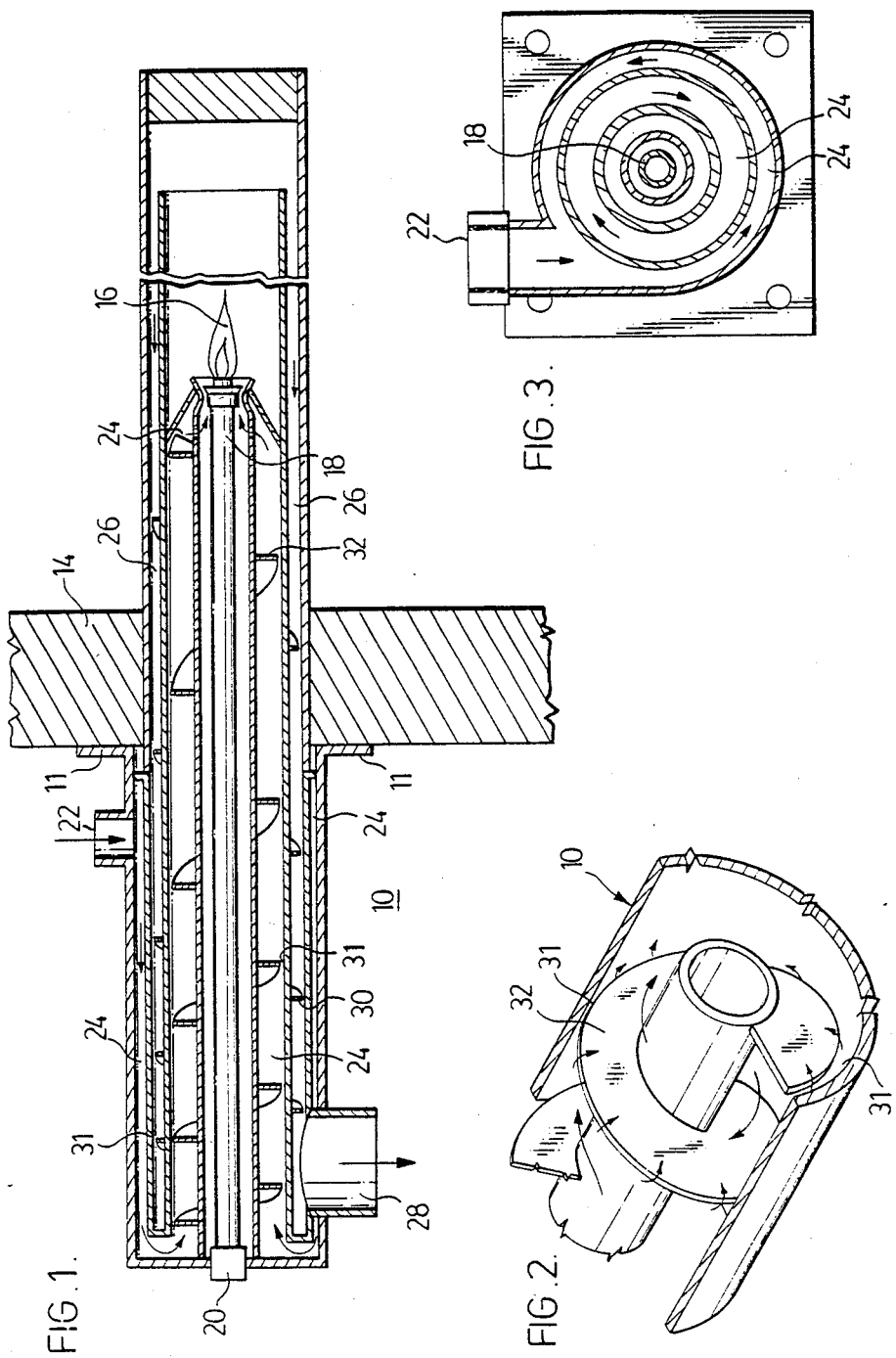

HEAT EXCHANGE APPARATUS FOR INDUSTRIAL FURNACES

FIELD OF THE INVENTION

The present invention relates to a heat exchanger or, more particularly, a recuperator for increasing the efficiency of operation of furnaces equipped with and without radiant tube type burner systems.

BACKGROUND OF THE INVENTION

To increase the efficiency of industrial type furnaces fired by radiant tube burners, it is known to employ heat exchangers or recuperators to transfer heat from combustion gas exhausted from the burner to combustion air flowing to the burner flame. While known recuperators in the industry have increased the efficiency of industrial furnaces, there is still a demand for improvement.

One type of recuperator known in the art is that referred to as the "Plug-In Recuperator". One Plug-In Recuperator is disclosed in Canadian Pat. No. 1,154,371, issued Sept. 27, 1983 to Collier. This recuperator is plugged in to the exhaust leg of a U-shaped radiant tube burner. The burner is fired by gas and oxygen in the other leg of the tube. Combustion air is fed to the burner through the recuperator. While this plug-in recuperator provides a one-pass heat transfer operation, i.e. the combustion air flows in counter-flow to the flow of exhaust gas, the heat recovered by this type of recuperator is not considered satisfactory. One criticism of the plug-in recuperator disclosed in said Canadian Pat. No. 1,154,371, is that the recuperator extends past the wall of the furnace and is believed to draw heat from the load in the furnace. This is believed to limit the efficiency of the industrial furnace.

Another type of recuperator is that shown in U.S. Pat. No. 4,090,558 issued to Akama on May 23, 1978. This patent discloses the use of a recuperator for a radiant type burner where the recuperator is located outside of the furnace. This recuperator employs a two pass heat exchange system (parallel flow and counter-flow) between the combustion air and the combustion gas. The combustion air and gas enter the heat exchanger tangentially and follow a helically wound path through the heat exchanger so as to increase the distance travelled by the gas and air. This enhances heat transfer.

Another typical recuperator referred to in the industry is a radiant tube recuperator. In this type of recuperator, the burner and the recuperator are formed in the same tube.

While the previously described recuperators are typical of those presently in use in industry, there is a demand for increased efficiency of industrial furnace operation to reduce the energy consumption of industrial furnaces.

OBJECTS OF THE PRESENT INVENTION

It is therefore an object of the present invention to provide a heat exchanger for use with a gas fired burner which can improve the operating efficiency of industrial furnaces.

It is another object of the present invention to provide a recuperator or heat exchanger for use with a burner which controls the fluid pressure and velocity of combustion gas and combustion air flowing through the recuperator.

In accordance with one aspect of the present invention there is provided a heat exchanger for heating air supplied to a burner. The heat exchanger includes first passage means through which combustion gas is exhausted from the burner. The heat exchanger further includes second passage means through which combustion air is supplied to the burner. The first and second passage means are arranged to transfer heat from the combustion gas to the combustion air. At least one of the first and second passage means includes helical guide means providing a substantially helical path along which fluid is directed through the at least one passage means. The helical guide means has a variable pitch which changes in a predetermined manner to control fluid pressure and velocity in the at least one passage means.

By providing a variable pitch in the heat exchanger of the present invention, the heat exchanger is able to control the fluid pressure and velocity in the respective passage means. As a result, the heat exchanger is capable of maintaining the velocity and pressure of the fluid through the passage means to enhance heat exchange from the combustion gas to the combustion air.

Throughout the specification and claims, the term "combustion gas" is used. It should be understood that this term refers to products of combustion and may include several gases.

The rate of change of the pitch of the helical guide means may change at a predetermined rate to maintain the fluid pressure and velocity in the passageway within predetermined limits. It should be understood that the term "predetermined limits" relates to those limits on pressure and velocity which permit exhanced heat transfer and acceptable pressure loss in the system.

In the preferred construction of the present invention, the rate of change of the variable pitch of the helical guide means in each of these passageways is substantially a linear function. The variable pitch of the helical guide means in the first passage means preferably decreases to maintain the combustion gas pressure and velocity within first predetermined limits while the variable pitch of the helical guide means in the second passage means preferably increases to maintain the combustion air pressure and velocity within second predetermined limits.

The helical guide means preferably are secured to an inner wall of the at least one passage means about which the helical guide means extends. The helical guide means does not extend outwardly entirely across the passageway such that a small gap is present between the outer edge of the helical guide means and the outer wall of the at least one passage means.

BRIEF DESCRIPTION OF THE DRAWINGS

For a better understanding of the nature and objects of the present invention, reference may be had by way of example to the accompanying diagrammic drawings in which:

FIG. 1 is a sectional side view of a recuperative radiant tube burner employing the heat exchanger of the present invention;

FIG. 2 is a partial perspective view showing the fluid flow through the combustion air passageway;

FIG. 3 is an end view showing the flow of combustion air in the present invention.

DESCRIPTION OF THE PREFERRED EMBODIMENTS

Figure 4:
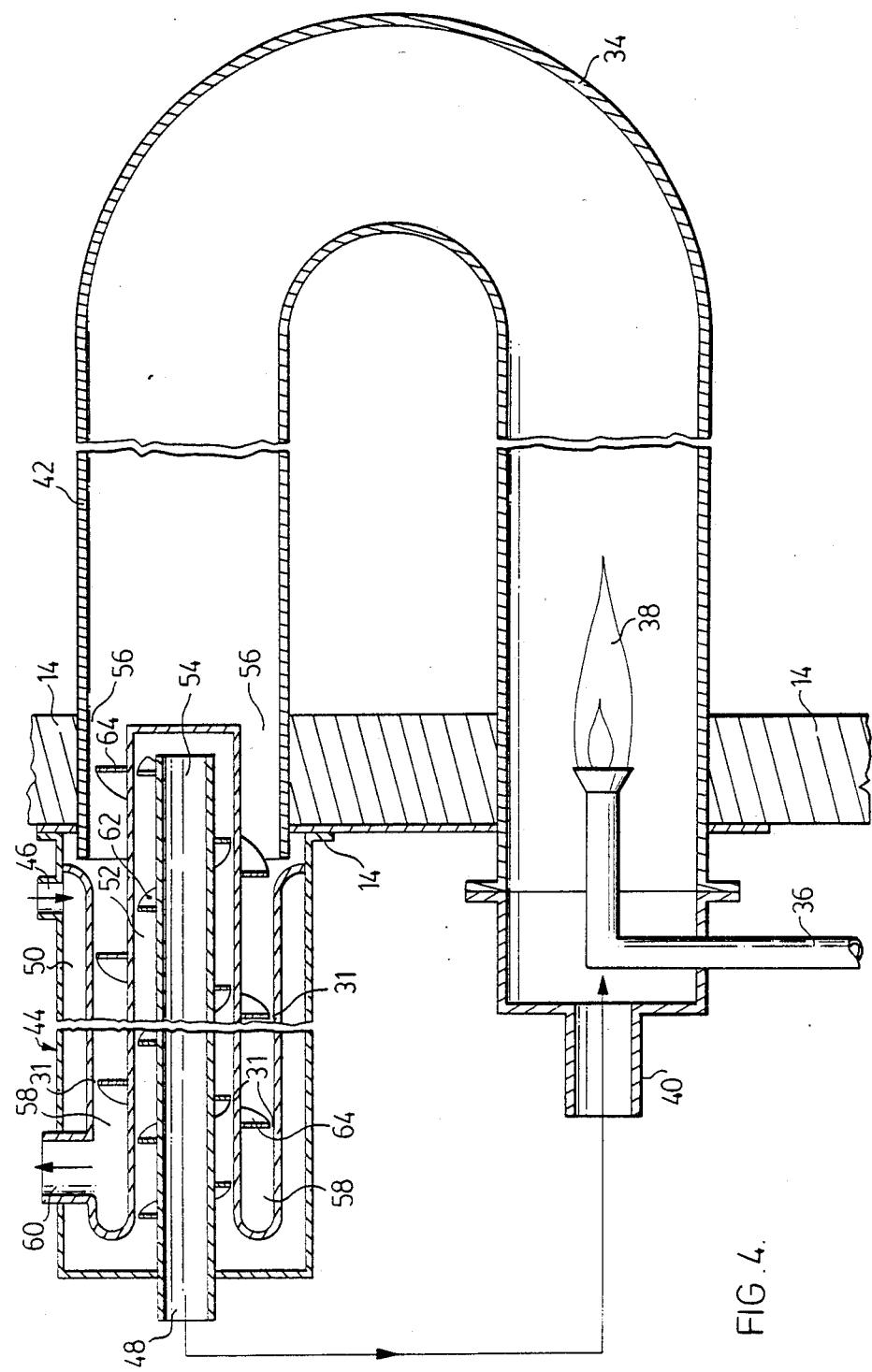
FIG. 4 is a second preferred embodiment showing a recuperator for a gas fired burner system having a U-shaped radiant tube.

Referring to FIGS. 1 to 3 there is shown a recuperator radiant tube burner at 10. The burner tube 10 is inserted into furnace 12 through an opening in the wall 14 of the furnace 12. Burner tube 10 is secured at its flange 11 to furnace wall 14. Gas is provided to the flame 16 of the burner 10 along pipe 18 from gas inlet 20. Combustion air tangentially enters the second passage means or combustion air passageway 24 and exits passageway 24 adjacent the flame 16. Combustion gas is then returned along the first passage means or combustion gas passageway 26 and exhausted through combustion gas outlet 28.

In each of the passageways 24 and 26 there is provided a helical guide means or baffles 30 and 32. Baffles 30 and 32 are secured to respective inner walls of their passageways and do not extend entirely across the passageway which allows fluid to flow through air gaps 31 in between the edges of the helical baffles and the outer wall of the passageways 30, 32. This added turbulence enhances the heat transfer in the system. It creates the required turbulence in the passages to disturb the boundary layer which in conventional recuperators hinders the most efficient convection heat transfer and makes them reliant on radiation.

The pitch of the helical path that the helical baffles 30, 32 follow is variable and increases at a predetermined rate for baffles 32 and decreases at a predetermined rate for baffles 30. The rate at which the pitch of baffle 32 increases is dependent upon the rate at which the combustion air is heated and the increase in the pressure and velocity of the combustion air. Conversely, the rate at which the pitch of baffle 30 decreases is dependent upon the rate at which the combustion gas loses heat and contracts. Further factors governing the rate of change of pitch of baffles 30, 32 are the desired heat transfer and acceptable pressure drops in the system.

Referring to FIG. 4 there is shown a radiant tube burner 34 having a gas inlet or piping 36 supplying gas to flame 38 in one leg of tube 34. Combustion air is supplied through inlet 40 to the flame 38. In the exhaust leg 42 of the tube burner 34, there is provided a recuperator shown at 44. Recuperator 44 is provided with an inlet 46 for tangentially receiving combustion air and a combustion air outlet 48. Combustion air outlet 48 is connected to inlet 40. Recuperator 44 is secured at its flange 45 to furnace wall 14.

Combustion air entering the recuperator 44 through inlet 46 flows through passageways 50, 52 and 54 to the outlet 48. Combustion gas enters the recuperator at 56 and travels along passageway 58 to the combustion gas outlet 60. Each of the passageways 52 and 58 are provided with helical guides or baffles 62 and 64, respectively. The rate of pitch of the baffles is altered such that the rate of pitch of baffles 62 increases as the combustion air increases in temperature. The pitch of baffles 64 decreases as the combustion gas temperature decreases. In this burner system the recuperator is what is referred to as a three-pass recuperator. In other words, the combustion air entering inlet 46 has three passes relative to the combustion gas. The first pass through passageway 50 is a parallel flow pass with the combustion gas in passageway 56. The second pass through passageway 52 is a counter-flow in that the combustion air flows in an opposite direction to the combustion gas 56. The third pass is through the center path 64 of the recuperator. The center path 64 facilitates the removal of heated combustion air from the recuperator.

In the preferred construction, the annular area of the waste gas chamber should be approximately 50% the annular area of the exhaust portion of the radiant tube.

The recuperator may be manufactured from heat resisting alloys for all surfaces exposed to exhaust gas stream with special attention to the thermal conductivity in expansion of the alloys selected.

In practice, the temperature of exhaust or combustion gas exhausted from the radiant tube leg 42 can be in a temperature range of 1600°–2000° F. and without recuperation may contain about 65% of the heat generated by the burner for the furnace. This represents a considerable amount of wasted energy.

In accordance with the invention, where a recuperator is located at the end of the radiant tube and a sealed burner is used at the other leg, fuel savings of 50% or more are achieved. A recuperator of this type has increased the efficiency of a heat treating furnace operating at 1650° F. from about 35% efficiency to about 65% efficiency.

We claim:

1. A heat exchanger for heating air supplied to a burner, said heat exchanger including:
   first passage means through which combustion gas is exhausted from the burner;
   second passage means through which combustion air is supplied to said burner;
   the first and second passage means being arranged to transfer heat from the combustion gas to the combustion air; and
   at least one of the first and second passage means including helical guide means providing a substantially helical path along which fluid is directed through the at least one passage means; the helical guide means having a variable pitch which changes in a predetermined manner to control fluid pressure and velocity in the at least one passage means; the helical guide means being secured to an inner wall of the one passage means about which the helical guide means extends, and the helical guide means not extending outwardly entirely across the passage means such that a small gap is present between the outer edge of the helical guide means and an outer wall of the at least one passage means.

2. A heat exchange for heating air supplied to a burner, said heat exchanger including:
   first passage means through which combustion gas is exhausted from the burner;
   second passage means through which combustion air is supplied to said burner;
   the first and second passage means being arranged to transfer heat from the combustion gas to the combustion air; and
   at least one of the first and second passage means including helical guide means providing a substantially helical path along which fluid is directed through the at least one passage means; the helical guide means having a variable pitch which changes in a predetermined manner to control fluid pressure and velocity in the at least one passage means; the first and second passage means each including helical guide means, the variable pitch of the helical guide means of the first passage means decreasing to maintain the velocity and pressure of the combustion gas within first predetermined limits and the variable pitch of the helical guide means of the second passage means increasing to maintain the velocity and pressure of the combustion air within second predetermined limits.

3. The heat exchanger of claim 2 wherein the helical guide means is secured to an inner wall of the one passage means about which the helical guide means extends and the helical guide means does not extend outwardly entirely across the passage means such that a small gap is present between the outer edge of the helical guide means and an outer wall of the at least one passage means.

4. A heat exchanger for heating air supplied to a burner, said heat exchanger including:

first passage means through which combustion gas is exhausted from the burner;

second passage means through which combustion air is supplied to said burner;

the first and second passage means being arranged to transfer heat from the combustion gas to the combustion air; and at least one of the first and second passage means including helical guide means providing a substantially helical path along which fluid is directed through the at least one passage means; the helical guide means having a variable pitch which changes in a predetermined manner to control fluid pressure and velocity in the at least one passage means; said first passage means comprising a combustion gas passageway having inner and outer concentric walls, and the second passage means comprises two combustion air passageways arranged in fluid flow communication; a first one of the two combustion air passageways having an inner wall common with at least a portion of the outer concentric wall of the combustion gas passageway and a second one of the two combustion air passageways having an outer wall common with at least a portion of the inner wall of the combustion air passageway; whereby combustion air flowing through the first combustion air passageway is a parallel flow relative to the flow of combustion gas through the combustion gas passageway and combustion air flowing through the second combustion air passageway is a counterflow to the flow of combustion gas through the combustion gas passageway.

5. The heat exchanger of claim 4 wherein the combustion gas passageway and the second combustion air passageway each include one of said helical guide means, the variable pitch of the helical guide means of the combustion gas passageway decreasing to maintain the velocity and pressure of the combustion gas within first predetermined limits, and the variable pitch of the second helical guide means of the combustion air passageway increasing to maintain the velocity and pressure of the combustion gas within second predetermined limits.

6. The heat exchanger of claim 5 wherein the second combustion air passageway includes a tubular return path in fluid flow communication with the second combustion air passageway through which the combustion air is exhausted from the heat exchanger and transferred to the burner.

7. The heat exchanger of claim 5 for use with a radiant tube burner for an industrial furnace wherein the burner is integrally constructed with the recuperator.

8. The heat exchanger of claim 6 for use with a U-shaped radiant tube type burner.

9. The heat exchanger of claim 8 wherein the heat exchanger is adapted to be plugged into an exhaust leg of the U-shaped radiant tube type burner.

10. The heat exchanger of claim 9 wherein said heat exchanger is open at one end such that the combustion gas passageway opens towards the exhaust leg of the U-shaped radiant tube.

11. The heat exchanger of claim 10 wherein the cross-sectional area of said combustion gas passageway is approximately 50 percent of the total cross-sectional area of the exhaust leg of the U-shaped radiant tube.

12. The heat exchanger of claim 5 wherein the helical guide means is secured to an inner wall of the one passage means about which the helical guide means extends and the helical guide means does not extend outwardly entirely across the passage means such that a small gap is present between the outer edge of the helical guide means and an outer wall of the at least one passage means.

* * * * *